(12) United States Patent
Asobe et al.

(10) Patent No.: US 7,940,451 B2
(45) Date of Patent: May 10, 2011

(54) WAVELENGTH CONVERTER AND WAVELENGTH CONVERSION APPARATUS

(75) Inventors: Masaki Asobe, Atsugi (JP); Takeshi Umeki, Atsugi (JP); Osamu Tadanaga, Atsugi (JP); Yoshiki Nishida, Atsugi (JP); Tsutomu Yanagawa, Atsugi (JP); Katsuaki Magari, Atsugi (JP); Hiroyuki Suzuki, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 148 days.

(21) Appl. No.: 12/440,006

(22) PCT Filed: Sep. 28, 2007

(86) PCT No.: PCT/JP2007/069025
§ 371 (c)(1),
(2), (4) Date: Mar. 4, 2009

(87) PCT Pub. No.: WO2008/041641
PCT Pub. Date: Apr. 10, 2008

(65) Prior Publication Data
US 2010/0039699 A1    Feb. 18, 2010

(30) Foreign Application Priority Data

Sep. 29, 2006 (JP) .................. 2006-268360

(51) Int. Cl.
*G02F 1/37* (2006.01)
(52) U.S. Cl. .......................... 359/328; 359/330; 385/122
(58) Field of Classification Search ........... 359/326–332
See application file for complete search history.

(56) References Cited

U.S. PATENT DOCUMENTS

| | | | |
|---|---|---|---|
| 5,815,307 A * | 9/1998 | Arbore et al. ............ | 359/328 |
| 6,806,986 B2 * | 10/2004 | Asobe et al. ............ | 359/238 |
| 2003/0231890 A1 | 12/2003 | Asobe et al. | |
| 2006/0132902 A1 | 6/2006 | Miller | |
| 2007/0058240 A1 | 3/2007 | Miller | |

FOREIGN PATENT DOCUMENTS

CN    1469181    1/2004
(Continued)

OTHER PUBLICATIONS

Tsutomu Yanagawa et al., *Broadband Difference Frequency Generation Around Phase-Match Singularity*, Applied Physic Letters, vol. 86, 161106 (2005).

(Continued)

*Primary Examiner* — Hemang Sanghavi
(74) *Attorney, Agent, or Firm* — Workman Nydegger (57) ABSTRACT

A wavelength converter which performs simultaneously wavelength conversion for a plurality of input light wavelengths that are unequally intervals, is provided. The nonlinear material of the wavelength converter has a modulation structure which has modulation of a nonlinear optical constant at a period $\Lambda_0$ in a propagating direction of light, a phase being continuously changed each period $\Lambda_0$ and a continuous phase modulation for a different period $\Lambda_{ph}$ being added to the modulation structure. The nonlinear material has a modulation structure obtained by changing a modulation curve for the phase modulation, wherein a phase mismatch $\Delta\beta$ is represented by $\Delta\beta=2\pi(n_3/\lambda_3-n_2/\lambda_2-n_1/\lambda_1)$, and at least three peaks at unequally intervals within a plurality of peaks for conversion efficiency represented by $2\pi/\Lambda_0+2\pi i/\Lambda_f$ (i=m, m+1, ..., n: where m and n are positive or negative integers) have highest conversion efficiency.

12 Claims, 10 Drawing Sheets

FOREIGN PATENT DOCUMENTS

| | | |
|---|---|---|
| EP | 1 372 025 A1 | 12/2003 |
| JP | 2004-20870 | 1/2004 |
| JP | 2004-233534 | 8/2004 |

OTHER PUBLICATIONS

Toshiaki Suhara et al., *Theoretical Analysis of Waveguide Second-Harmonic Generation Phase Matched with Uniform and Chirped Gratings*, IEEE Journal of Quantum Electronic, vol. 26, No. 7, 1990, pp. 1265-1276.

Y. Nishida et al., *Direct-Bonded QPM-LN Ridge Waveguide with High Damage Resistance at Room Temperature*, Electronics Letters, vol. 39, No. 7, Apr. 3, 2003, pp. 609-611.

Hiroyuki Ishii et al., *High-Power (40mW) L-Band Tunable DFB Laser Array Module Using Current Tuning*, Optical Fiber Communication Conference 2005 Technical Digest, vol. 2, 2005, pp. 91.

M. Notomi et al., *Broad-Band Tunable Two-Section Laser Diode with External Grating Feedback*, IEEE Photonics Technology Letters, vol. 2, No. 2, Feb. 1990, pp. 85-87.

Masaki Asobe et al., *Multiple Quasi-Phase-Matched Device Using Continuous Phase Modulation of $X^{(2)}$ Grating and Its Application to Variable Wavelength Conversion*, IEEE Journal of Quantum Electronics, vol. 41, No. 12, Dec. 2005, pp. 1540-1547.

Ben-Yuan Gu et al., *Investigations of Harmonic Generations in Aperiodic Optical Superlattices*, Journal of Applied Physics, vol. 87, No. 11, Jun. 2000, pp. 7629-7637.

Asobe, M. et al., "Multiple Quasi-Phase-Matched Device Using Continuous Phase Modulation of $\chi^{(2)}$ Grating and Its Application to Variable Wavelength Conversion," *IEEE Journal of Quantum Electronics*, Dec. 2005, vol. 41, No. 12, p. 1540-1547.

Ben-Yuan Gu et al., "Investigation of harmonic generations in aperiodic superlattices," *Journal of Applied Physics*, Jun. 2000, vol. 87, No. 11, p. 7629-7637.

PCT Notification of Transmittal of Copies of Translation of the International Preliminary Report on Patentability (Chapter 1 or Chapter II of the Patent Cooperation Treaty) of related Japanese Application No. PCT/JP2007/069025, dated Apr. 30, 2009 (7 pages).

Office Action for corresponding Chinese Application No. 200780033221.7, mailing date Jun. 12, 2010 (English).

\* cited by examiner

(Prior Art)

WAVELENGTH CONVERTER AND WAVELENGTH CONVERSION APPARATUS

TECHNICAL FIELD

The present invention relates to a wavelength converter and a wavelength conversion apparatus, and relates more particularly to a wavelength converter and a wavelength conversion apparatus which perform simultaneously wavelength conversion for a plurality of input light wavelengths that are unequally intervals.

BACKGROUND ART

Conventionally, semiconductor lasers that can output light in various wavelength ranges, covering those from the visible light range to the mid-infrared range of wavelengths, have been studied and developed. However, a light source easily employed at room temperature has not yet been developed, for example, for the visible light range of wavelengths from 500 to 600 nm, or for the near-infrared to the mid-infrared range of wavelengths from 2 to 5 μm. Therefore, for a wavelength range where the direct emission of light by a light source is difficult, a light source for performing wavelength conversion employing nonlinear optical effects is used.

Various types of wavelength converters are known, and from a practical viewpoint, a waveguide type wavelength converter is most appropriate that employs periodic modulation of nonlinear optical constant for quasi-phase matching. As a method for constituting a periodical modulation structure, either the sign of a nonlinear optical constant is alternately inverted, or a portion where a nonlinear optical constant is large and a portion where it is small are almost alternately arranged. In a ferroelectric crystal such as $LiNbO_3$, since the positive or negative sign of a nonlinear optical constant (a constant d) corresponds to the polarity obtained by spontaneous polarization, the sign of the nonlinear optical constant can be inverted by reversing the spontaneous polarization.

Figure 1:
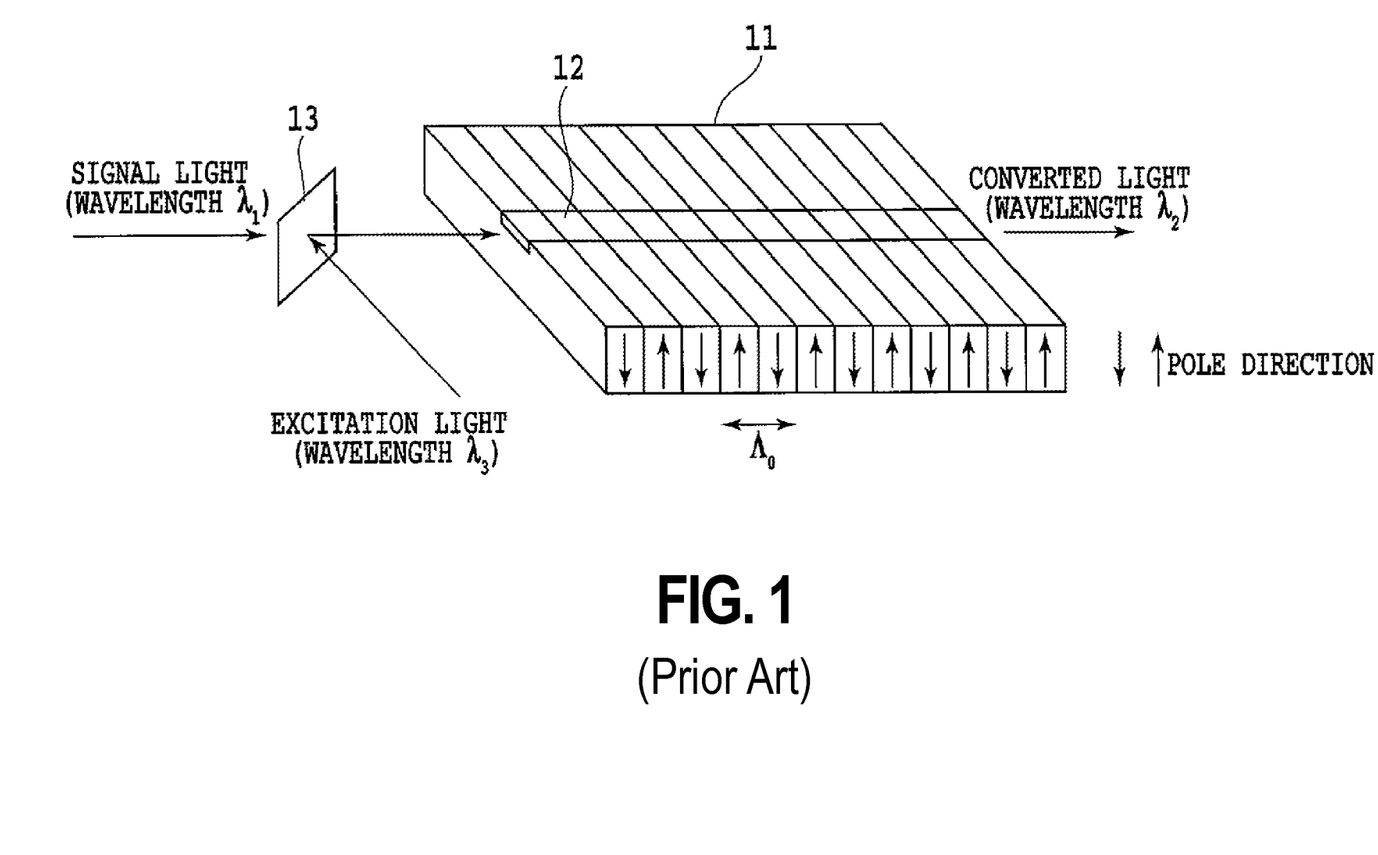
FIG. 1 is a diagram illustrating an arrangement of a light source that employs a conventional wavelength converter.

FIG. 1 illustrates an arrangement of a light source that employs a conventional wavelength converter. The wavelength converter includes an optical waveguide 12 that is formed in a $LiNbO_3$ substrate 11 and has periodically poled structure. A signal light of a wavelength $\lambda_1$ and a pump light of a wavelength $\lambda_3$ are emitted by two semiconductor lasers. The signal light and the pump light are combined by a multiplexer 13 and are entered to the optical waveguide 12. Since difference frequency generation is performed due to nonlinear optical effects, a converted light of a wavelength $\lambda_2$ is output from the optical waveguide 12. The difference frequency generation is employed for the light source in this example, however, a light source may employ sum frequency generation or second harmonic generation and a light source which emits converted light of a short wavelength may be provided.

Assuming $\lambda_1$, $\lambda_2$ and $\lambda_3$ are defined as wavelengths of a signal light (a first incident light), a converted light (an idler light) and a pump light (a second incident light) for a case of frequency difference generation, the following relationship is established for these three wavelengths.

$$1/\lambda_3 = 1/\lambda_2 + 1/\lambda_1 \tag{1}$$

When the two incident wavelengths are, for example, 1.55 μm and 1.06 μm, a converted wavelength of 3.55 μm can be generated. When the two incident wavelengths are 1.55 μm and 0.94 μm, a converted wavelength of 2.39 μm can be generated. Further, for a case of sum frequency generation, expression (1) is employed when $\lambda_1$, $\lambda_2$ and $\lambda_3$ are defined as the wavelengths of the signal light (a first incident light), the pump light (a second incident light) and the converted light (a sum frequency light), and for a case of second harmonic generation, expression (1) is employed when $\lambda_1$ (=$\lambda_2$) is defined as the wavelength of the incident light and $\lambda_3$ is defined as the wavelength of the converted light (a second harmonic light).

When $n_1$ is a refractive index of a nonlinear optical material at the signal wavelength $\lambda_1$, $n_2$ is a refractive index at the converted wavelength $\lambda_2$ and $n_3$ is a refractive index at the excitation wavelength $\lambda_3$, and $\Lambda_0$ is defined as a modulation period for a nonlinear optical constant, a phase mismatch $\Delta\beta$ is represented by:

$$\Delta\beta = 2\pi(n_3/\lambda_3 - n_2/\lambda_2 - n_1/\lambda_1) \tag{2}$$

When L denotes the length of the waveguide of a wavelength converter, conversion efficiency $\eta$ is represented by:

[Expression 1]

$$\eta = \eta \max \left[ \frac{\sin\left(\left(\Delta\beta - \frac{2\pi}{\Lambda_0}\right)\frac{L}{2}\right)}{\left(\left(\Delta\beta - \frac{2\pi}{\Lambda_0}\right)\frac{L}{2}\right)} \right]^2 \tag{3}$$

By referring to expression (3), the conversion efficiency $\eta$ becomes highest when the phase mismatch $\Delta\beta$ is $2\pi/\Lambda_0$.

When the excitation wavelength $\lambda_3$ is fixed, the signal wavelength that satisfies a quasi-phase matching condition of a phase mismatch $\Delta\beta = 2\pi/\Lambda_0$ depends on wavelength dispersion of the refractive index of the nonlinear optical material, and substantially, is determined uniquely when the conversion period $\Lambda_0$ is determined. When the excitation wavelength $\lambda_3$ is changed from a wavelength (quasi-phase match wavelength) that satisfies the quasi-phase matching condition, the conversion efficiency is deteriorated in consonance with the expressions (2) and (3).

Figure 2:
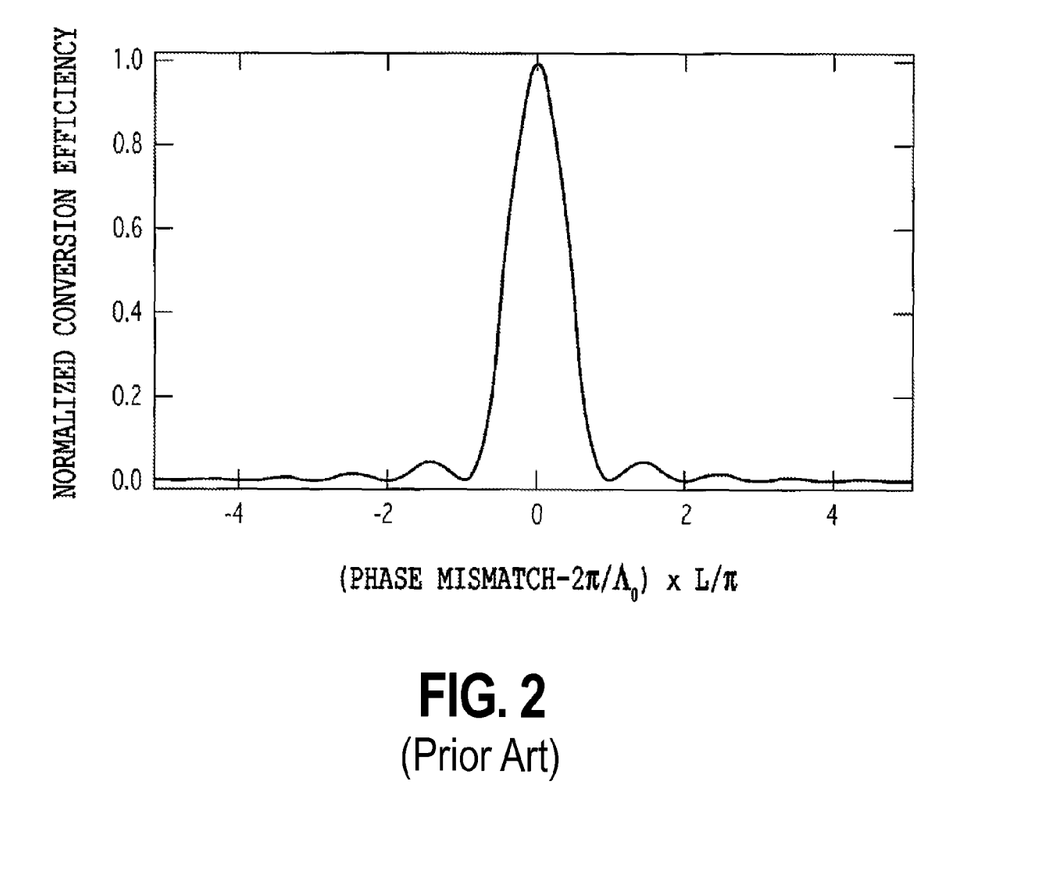
FIG. 2 is a diagram showing a change in conversion efficiency relative to a phase mismatch.

FIG. 2 illustrates a change in the conversion efficiency relative to a phase mismatch. In FIG. 2, the conversion efficiency $\eta$ is normalized by employing a value of 1 as the maximum value. In a case of that an $LiNbO_3$ substrate 50 mm long is employed as a wavelength converter, the wavelength band for a phase mismatch where the conversion efficiency $\eta$ is half the maximum value is narrow, i.e., about 9.3 nm, when a wavelength is converted for a 3.35 μm band. As is apparent from expression (1), a plurality of different excitation wavelengths is required for the conversion of the signal wavelength $\lambda_1$ to an arbitrary wavelength $\lambda_2$. However, using a periodical modulation structure of a nonlinear optical constant at a constant period, a permissible range for a signal wavelength is narrow, and the signal wavelength can not be greatly changed. For example, in a case of that this wavelength converter is applied for a gas measurement apparatus that measures absorption of various types of gases and performs gas detection, it is preferable that wavelength sweeping be enabled for several wavelengths in order to measure a plurality of absorbed gases. However, a light source employing the conventional wavelength converter is not applicable for such operation.

On the other hand, well known is the fact that in a case of that a group velocity matching condition is established between converted light and signal light, or between converted light and pump light, a change in a propagation constant caused by a wavelength change is offset. Then, a change in a phase mismatch represented by expression (2) is moderated, so that phase matching can be performed for a broad wavelength band (see, for example, non-patent document 1). However, since this method depends on the dispersion of a nonlinear optical material that is in use, the method is employed only for a set of special wavelengths. There is another well known method for chirping the modulation period of a nonlinear optical constant in a quasi-phase matching wavelength converter (see, for example, non-patent document 2). By employing this method, a broadband wavelength converter can be provided for an arbitrary wavelength range, however the conversion efficiency is inversely reduced in proportion to the wavelength band. Therefore, in a case of that a high output is to be obtained in a wide range, the intensity of pump light or signal light must be increased, and an optical fiber amplifier, etc., is additionally required.

In a case of that continuous wavelength sweeping need not always be performed, phase matching is not required for a broad wavelength range, and a plurality of phase matching peaks corresponding to a plurality of excitation wavelengths must simply be obtained. Therefore, it is well known that a continuous phase modulation or a frequency modulation of a different period $\Lambda_{ph}$ is added to a structure having a modulation of a nonlinear optical constant with a period $\Lambda_0$ (see, for example, patent document 1). It is also well known that phase modulation or frequency modulation is optimized to provide the maximum conversion efficiency for a periodical phase mismatch (see, for example, patent document 2). According to this method, a plurality of peaks are periodically included in wavelengths that are away from a wavelength having a phase mismatch $\Delta\beta=2\pi/\Lambda_0$ at a phase mismatch of $2\pi/\Lambda_{ph}$ interval. Compared with a method for continuously broadening a phase matching curve, the conversion efficiency can be increased at the individual peaks.

However, in a case of that this method is applied for the above described gas measurement apparatus, the wavelengths that are required to be output for measurement are not always spaced equally. Even when optimization is performed to provide a peak for each of the wavelengths to be measured, an unwanted peak may be generated for measurement, and as a result, the conversion efficiency may be reduced at a phase matching peak that is required for the generation of a wavelength. Therefore, a problem encountered here is that when phase modulation or frequency modulation is simply added to the structure, as in the conventional manner, efficient wavelength conversion can not performed for a plurality of wavelengths that are not spaced equally.

An objective of the present invention is to provide a wavelength converter which performs simultaneously wavelength conversion for a plurality of input light wavelengths that are unequally intervals, and which causes little conversion efficiency deterioration, and a wavelength conversion apparatus of wavelength tunable type.

Patent Document 1: Japanese Patent Laid-Open No. 2004-20870
Patent Document 2: Japanese Patent Laid-Open No. 2004-233534
Non-patent Document 1: T. Yanagawa, et. al., Applied Physics Letters, Vol. 86, p. 161106, 2005
Non-patent Document 2: T. Suhara, et. al., IEEE J. of Quantum Electronics, Vol. 26, p. 1265, 1990
Non-patent Document 3: Y. Nishida, et. al., Electronics Letters, Vol. 39, p. 609, 2003
Non-patent Document 4: H. Ishii, Optical Fiber Communication Conference 2005 Technical Digest, Vol. 2, p. 91, 2005
Non-patent Document 5: M. Notomi, IEEE Photonics Technology Letters, Vol. 2, P. 85, 1990

DISCLOSURE OF THE INVENTION

In order to achieve this objective, according to a first aspect of the present invention, a wavelength converter enters incident light of one ($\lambda_1=\lambda_2$) or two ($\lambda_1$ and $\lambda_2$, or $\lambda_1$ and $\lambda_3$) wavelengths having a relationship of $1/\lambda_3=1/\lambda_2+1/\lambda_1$ into a nonlinear optical material to output a converted light of a wavelength $\lambda_3$ or $\lambda_2$ wherein the nonlinear material has a modulation structure which has modulation of a nonlinear optical constant at a period $\Lambda_0$ in a propagating direction of light, a phase being continuously changed each period $\Lambda_0$ and a continuous phase modulation for a different period $\Lambda_{ph}$ being added to the modulation structure when refractive indexes for the nonlinear material relative to the wavelengths $\lambda_1$, $\lambda_2$, and $\lambda_3$ are defined as $n_1$, $n_2$ and $n_3$ respectively, the nonlinear material has a modulation structure obtained by changing a modulation curve for the phase modulation, wherein a phase mismatch $\Delta\beta$ is represented by $\Delta\beta=2\pi(n_3/\lambda_3-n_2/\lambda_2-n_1/\lambda_1)$, and at least three peaks at unequally intervals within a plurality of peaks for conversion efficiency represented by $2\pi/\Lambda_0+2\pi i/\Lambda_{ph}$ (i=m, m+1, . . . , n: where m and n are positive or negative integers) have highest conversion efficiency.

The modulation structure of the first aspect which is obtained by changing a modulation curve for phase modulation is designed so that the smallest value for an evaluation function T is obtained, wherein a modulation curve of the nonlinear optical material for each period $\Lambda_0$ is changed; a spatial change d(z) for the nonlinear optical constant at a location z in the light propagating direction is calculated; a Fourier transform is performed for the spatial change d(z); conversion efficiencies η (i) at individual peaks are obtained; and a desired conversion efficiency $\eta_t(i)$ is employed to calculate the evaluation function T, as below, $$T=\Sigma_{i=m}^{i=n}[\eta(i)-\eta_t(i)]^2.$$  [Expression 2]

The nonlinear material may have a periodical structure which has modulation of a nonlinear optical constant at a period $\Lambda_0$ in a propagating direction of light, a period being continuously changed each period $\Lambda_0$ and a continuous frequency modulation for a different period $\Lambda_f$ being added to the periodical structure.

Furthermore, the nonlinear optical material is either LiNbO$_3$, KNbO$_3$, LiTaO$_3$, LiNb$_{(x)}$Ta$_{(1-x)}$O$_3$ (0≦x≦1), Li$_{(x)}$K$_{(1-x)}$Ta$_{(y)}$Nb$_{(1-y)}$O$_3$ or KTiOPO$_4$, or one of those compounds that contains at least one component selected from a group consisting of Mg, Zn, Sc and In as an additive.

According to a second aspect of the present invention, a wavelength conversion apparatus comprises: a signal light source being wavelength tunable type for outputting a signal light of a wavelength $\lambda_1$; a pump light source for outputting a pump light of a wavelength $\lambda_2$ or $\lambda_3$; a multiplexer for multiplexing the signal light and the pump light; and a wavelength converter connected to the multiplexer for entering incident light of two wavelengths ($\lambda_1$ and $\lambda_2$, or $\lambda_1$ and $\lambda_3$) having a relationship of $1/\lambda_3=1/\lambda_2+1/\lambda_1$ into a nonlinear optical material to output a converted light of the wavelength $\lambda_3$ or $\lambda_2$, wherein the nonlinear material has a modulation structure which has modulation of a nonlinear optical constant at a period $\Lambda_0$ in a propagating direction of light, a phase being continuously changed each period $\Lambda_0$ and a continuous phase modulation for a different period $\Lambda_{ph}$ being added to the modulation structure, wherein, when refractive indexes for the nonlinear material relative to the wavelengths $\lambda_1$, $\lambda_2$ and $\lambda_3$ are defined as $n_1$, $n_2$ and $n_3$ respectively, the nonlinear material has a modulation structure obtained by changing a modulation curve for the phase modulation, wherein a phase mismatch $\Delta\beta$ is represented by $\Delta\beta=2\pi(n_3/\lambda_3-n_2/\lambda_2-n_1/\lambda_1)$, and at least three peaks at unequally intervals within a plurality of peaks for conversion efficiency represented by $2\pi/\Lambda_0 + 2\pi i/\Lambda_{ph}$ (i=m, m+1, ..., n: where m and n are positive or negative integers) have highest conversion efficiency.

Further, a wavelength conversion apparatus may include a wavelength converter for entering incident light of one wavelength ($\lambda_1=\lambda_2$) having a relationship of $1/\lambda_3=1/\lambda_2+1/\lambda_1$ into a nonlinear optical material to output a converted light of the wavelength $\lambda_3$. In addition, the signal light source may include a plurality of DFB-LDs, a coupler for coupling lights outputted by the individual DFB-LDs, and a semiconductor optical amplifier connected to the output terminal of the coupler.

According to third aspect of the invention, a method for manufacturing a wavelength converter for entering incident light of one ($\lambda_1=\lambda_2$) or two ($\lambda_1$ and $\lambda_2$, or $\lambda_1$ and $\lambda_3$) wavelengths having a relationship of $1/\lambda_3=1/\lambda_2+1/\lambda_1$ into a nonlinear optical material to output a converted light of a wavelength $\lambda_3$ or $\lambda_2$, wherein the nonlinear medium has a modulation structure which has modulation of a nonlinear optical constant at a period $\Lambda_0$ in a propagating direction of light, a phase being continuously changed each period $\Lambda_0$ and a continuous phase modulation for a different period $\Lambda_{ph}$ being added to the modulation structure, comprises: changing a phase modulation curve of the nonlinear optical material for each period $\Lambda_0$; calculating a spatial change d(z) for the nonlinear optical constant at a location z in the light propagating direction; performing a Fourier transform for the spatial change d(z) to obtain conversion efficiencies $\eta(i)$ at individual peaks; and employing a desired conversion efficiency $\eta_t(i)$ to calculate an evaluation function T, as below, $$T=\Sigma_{i=m}^{i=n}[\eta(i)-\eta_t(i)]^2 \qquad \text{[Expression 3]}$$

and changing the phase modulation curve, so that the smallest value for the evaluation function T is obtained.

The nonlinear medium may have a periodical structure which has modulation of a nonlinear optical constant at a period $\Lambda_0$ in a propagating direction of light, a period being continuously changed each period $\Lambda_0$ and a continuous frequency modulation for a different period $\Lambda_f$ being added to the periodical structure.

BEST MODE FOR CARRYING OUT THE INVENTION

The embodiment of the present invention will now be described in detail while referring to drawings. In this embodiment, a continuous phase modulation or a periodical phase modulation of a different period $\Lambda_{ph}$ is added to a structure having a modulation of a nonlinear optical constant occurs with a period $\Lambda_0$, and also a modulation curve was set to obtain a smallest evaluation function T. With this arrangement, it was found that a plurality of phase matching peaks that are unequally intervals can be obtained, and a wavelength converter providing high efficiency can be produced.

A method for setting a phase modulation curve in a case of a phase modulation as an example will be described. Assume that d(z) is defined as a nonlinear optical constant at a location z, in a light propagation direction, along an optical waveguide that is formed in a nonlinear optical material. Further, assume that a nonlinear optical material of from z=0 to z=L is present. After pump light and signal light have been propagated through the nonlinear optical material, an obtained conversion efficiency (z=L) is provided, relative to a phase mismatch $\Delta\beta$, by the following expression.

[Expression 4]

$$\eta(\Delta\beta) \propto \left| \int_0^L d(z)\exp(-i\Delta\beta z)dz \right|^2 \qquad (4)$$

When a spatial change d(z) for the nonlinear optical constant is obtained based on this expression, and a Fourier transform is performed, a change in the conversion efficiency, relative to the phase mismatch $\Delta\beta$, can be calculated.

Figure 3:
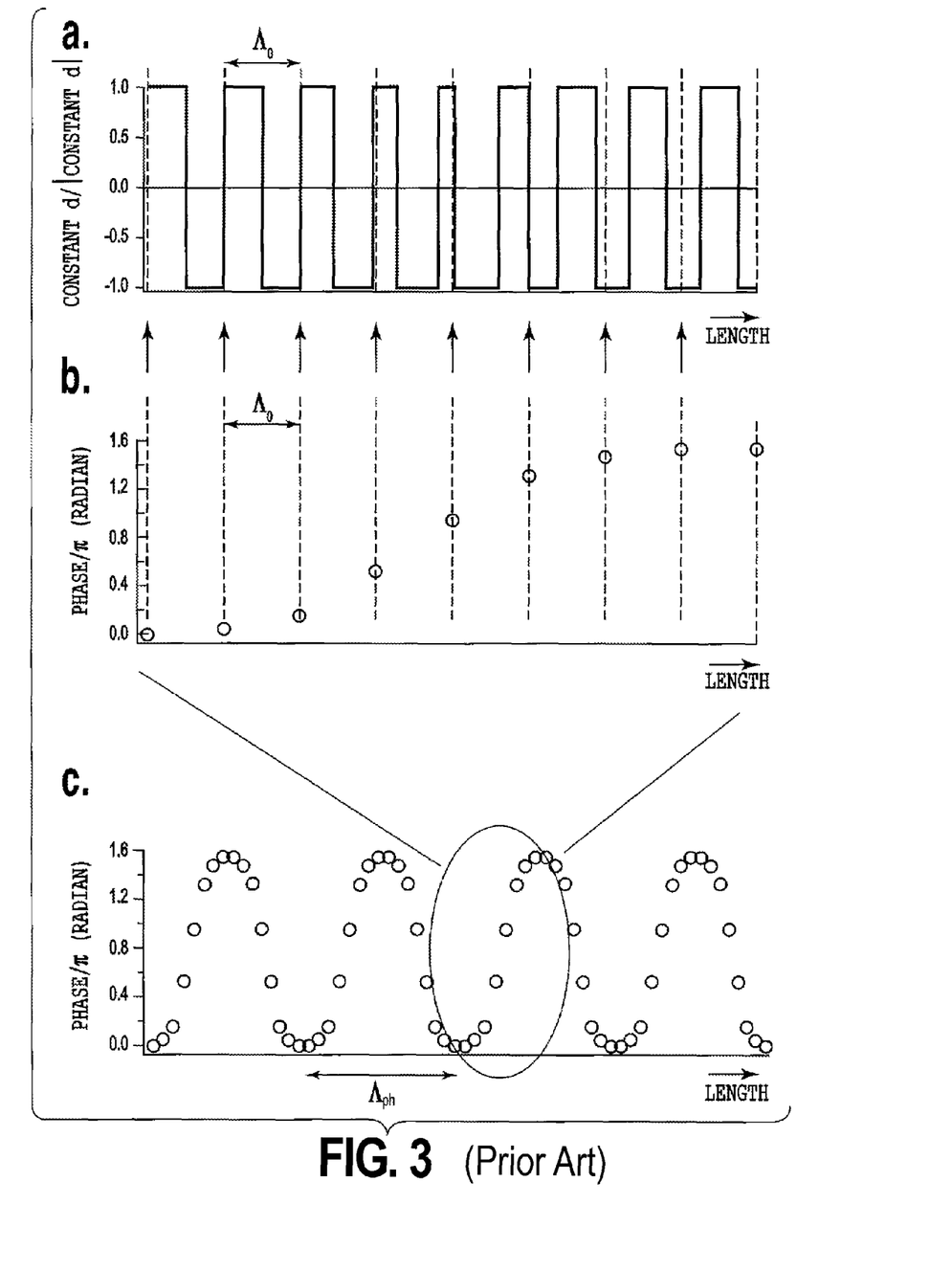
FIG. 3 is a diagram illustrating a part of a periodical modulation structure for a conventional wavelength converter.

FIG. 3 illustrates a part of a periodical modulation structure of a conventional wavelength converter. A ferroelectric crystal $LiNbO_3$ as a nonlinear optical material is employed to perform polarization reversion, and the sign of the nonlinear optical constant is inverted. FIG. 3a shows a part of the modulation structure indicating a change in a nonlinear optical constant in the longitudinal direction. The nonlinear optical constant is inverted within a specified period $\Lambda_0$, and an initial phase for each period is changed. FIG. 3b shows a phase change for each period in FIG. 3a. A periodical modulation structure added to such a phase modulation has a modulation structure at a period $\Lambda_0$ and a continuous phase modulation for a different period $\Lambda_{ph}$ is added to the modulation structure, as shown in FIG. 3c.

Figure 4A:
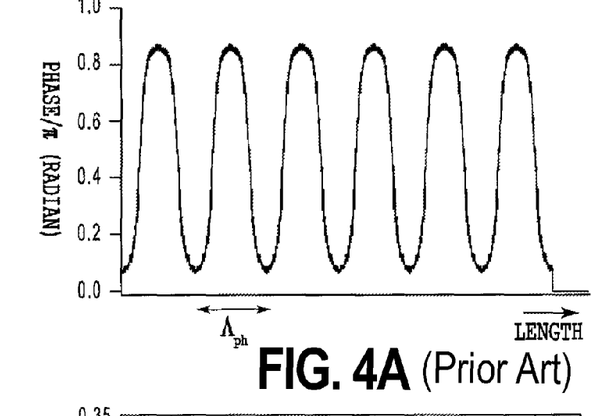
FIG. 4A is a diagram showing a first example phase modulation curve, indicating a phase modulation curve for a conventional wavelength converter and the dependency of conversion efficiency relative to a phase mismatch.
Figure 4B:
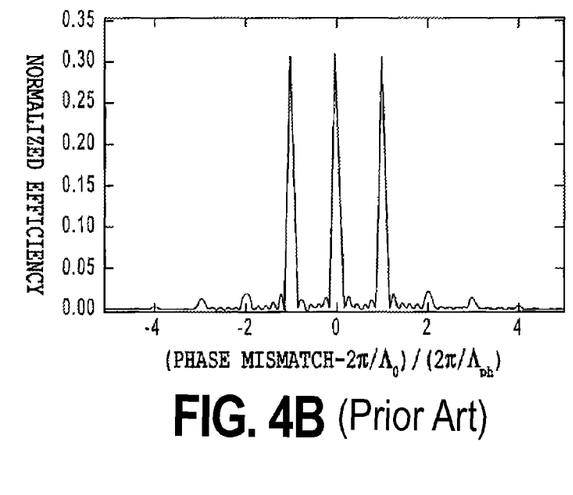
FIG. 4B is a diagram showing a phase mismatch relative to the phase modulation curve in the first example.
Figure 4C:
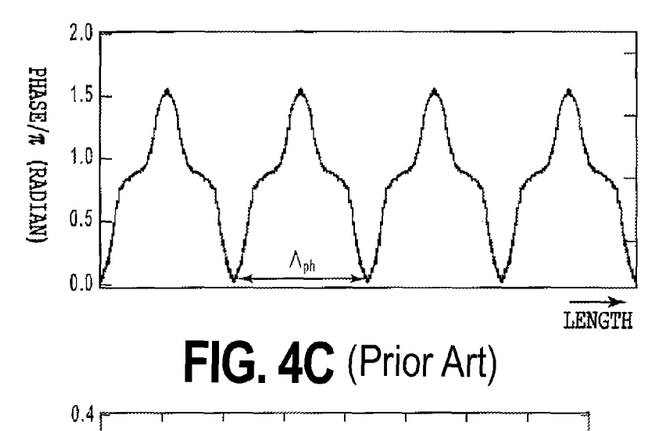
FIG. 4C is a diagram showing a second example phase modulation curve, indicating a phase modulation curve for the conventional wavelength converter and the dependency of conversion efficiency relative to a phase mismatch.
Figure 4D:
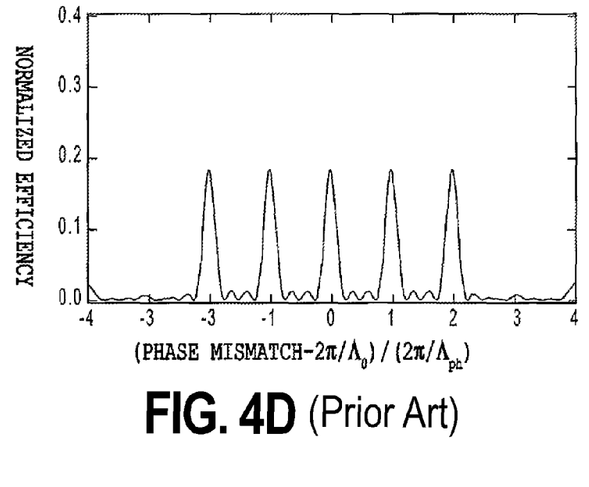
FIG. 4D is a diagram showing a phase mismatch relative to the phase modulation curve in the second example.

FIGS. 4A to 4D illustrate the phase modulation curves of a conventional wavelength converter and the dependency of conversion efficiency relative to a phase mismatch. The conversion efficiency is normalized by employing a value of 1 in a case of the efficiency when a nonlinear optical material having the same length without a phase modulation is employed. For example, for a phase modulation curve in a first example in FIG. 4A, a matching phase curve in FIG. 4B is obtained. For a phase modulation curve in a second example in FIG. 4C, a matching phase curve in FIG. 4D is obtained. That is, a conversion efficiency peak appears at each matching phase $\Delta\beta$ ($=2\pi/\Lambda_0$, $2\pi/\Lambda_0 \pm 2\pi/\Lambda_{ph}$, $2\pi/\Lambda_0 \pm 4\pi/\Lambda_{ph}$, ...), which is away from $2\pi/\Lambda_0$ at $2\pi/\Lambda_{ph}$ interval. According to the conventional art, since such periodical modulation is performed, a phase mismatch $\Delta\beta$, at which conversion efficiency is at a peak, periodically appears as shown in FIGS. 4B and 4D. For the sake of convenience for the description, when the phase mismatch $\Delta\beta$ is $2\pi/\Lambda_0 + 2\pi i/\Lambda_{ph}$ (i=m, m+1, ..., n: where m and n are positive or negative integers), the obtained conversion efficiency peak is defined as the i-th peak.

An explanation will now be given for a case in that the greatest peak is obtained for the −1st order, the 0th order and the 3rd at unequally intervals. First, the phase modulation curve is changed for each periodical modulation structure of the nonlinear optical material, and the spatial change d(z) for the nonlinear optical constant is calculated. Then, a Fourier transform for the spatial change d(z) is performed to obtain conversion efficiency for individual peaks, and the conversion efficiency at a desired peak is employed to calculate an evaluation function T, given below. Finally, the calculation is optimally performed, as needed, so that the smallest value for the evaluation function T is obtained.

[Expression 5]

$$T = \sum_{j=-4}^{4} [\eta(j) - \eta_t(j)]^2 \quad (5)$$

Here, $\eta(j)$ denotes the conversion efficiency for the j-th peak and $\eta_t(j)$ denotes a target conversion efficiency for the j-th peak, and in this case, the target efficiency is set as follows.

$\eta(-4)=0$ $\eta(-3)=0$ $\eta=(-2)=0$ $\eta(-1)=\eta_{norm}/3$ $\eta(0)=\eta_{norm}/3$ $\eta(1)=0$ $\eta(2)=0$ $\eta(3)=\eta_{norm}/3$ $\eta(4)=0$ where $\eta_{norm}$ is the conversion efficiency of a wavelength converter having the same length without a phase modulation.

Figure 5A:
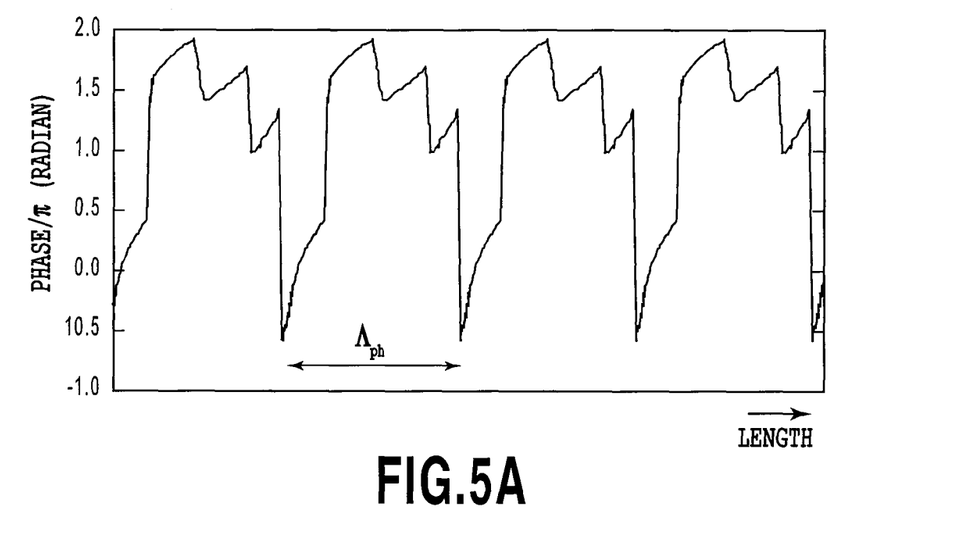
FIG. 5A is a diagram showing a phase modulation curve, indicating a phase modulation curve for a wavelength converter according to the present embodiment and the dependency of conversion efficiency on a phase mismatch.
Figure 5B:
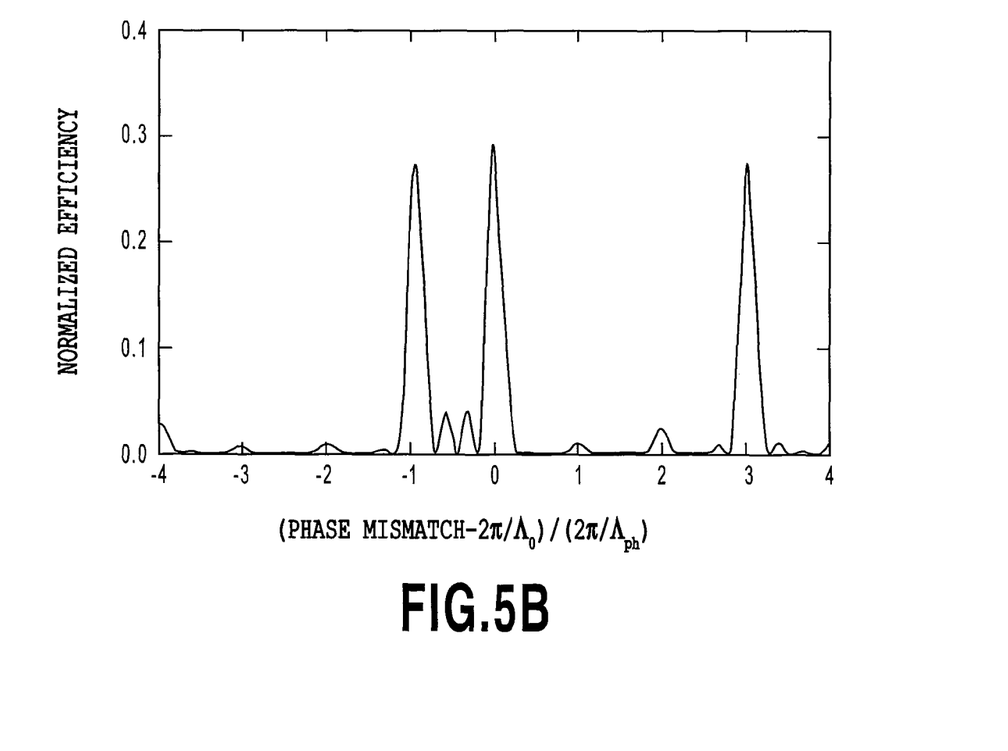
FIG. 5B is a diagram showing a phase mismatch relative to the phase modulation curve in this embodiment.

FIGS. 5A and 5B illustrate the phase modulation curve for a wavelength converter according to the present embodiment and the dependency of conversion efficiency relative to a phase mismatch. The conversion efficiency shown here is normalized by employing a value of 1 in a case of the efficiency when a nonlinear optical material having the same length without a phase modulation is employed. For example, for a phase modulation curve in FIG. 5A, a phase matching curve in FIG. 5B is obtained. Although continuous phase modulation is periodically employed, only the conversion efficiency of phase matching peaks at unequally intervals can be increased by suppressing the efficiency at the unnecessary peaks. A description has been given for an example where phase modulation was provided. However, for a case where continuous frequency modulation of a different period is performed in addition to a modulation period for the nonlinear optical constant, the above described optimization process only is performed, so that only the efficiency of peaks at unequally intervals can be increased.

It should be noted that the nonlinear optical material is not only limited to $LiNbO_3$, but also can be $KNbO_3$, $LiTaO_3$, $LiNb_{(x)}Ta_{(1-x)}O_3$ ($0 \leq x \leq 1$), $Li_{(x)}K_{(1-x)}Ta_{(y)}Nb_{(1-y)}O_3$ or $KTiOPO_4$. Furthermore, at least one component selected from a group consisting of Mg, Zn, Sc and In may be employed as an additive for this compound.

Embodiment 1

According to embodiment 1, a signal light wavelength in the 1.55 μm band and a pump light wavelength of 1.07 μm are employed, and a conversion light wavelength in the 3.4 μm band is obtained using difference frequency generation. A wavelength converter is produced, for example, by employing a wafer bonding method disclosed in non-patent document 3.

First, the Z face of an $LiNbO_3$ is coated with a resist, and a modulation structure is patterned thereon using photolithography. Electrodes are then attached, using vapor deposition, to the substrate face coated with the resist, and an electrolytic solution contacts both faces of the substrate. When an electric field is then applied to the two faces of the substrate, via the electrolytic solution, the electrodes are brought into direct contact with the region of the $LiNbO_3$ substrate to which none of the resist has been applied, so that a domain inversion occurs in this region.

Since the width of the domain where the domain inversion has occurred becomes slightly greater than the width of the electrode, a mask used for photography must be designed while taking this width increase into account. In this fashion, a periodically poled structure is formed for the $LiNbO_3$ substrate, which serves as the core of an optical waveguide. Following this, using the wafer bonding method, an $LiTaO_3$ substrate is adhered to the $LiNbO_3$, on which the periodically poled structure is formed, and the resultant $LiNbO_3$ substrate is polished to obtain a predetermined thickness. Finally, the $LiNbO_3$ substrate is diced to fabricate an optical waveguide. A length L of the wavelength converter is 48 mm.

The periodically poled structure and the phase matching characteristics will now be described in detail. In embodiment 1, a modulation structure for a basic period $\Lambda_0 = 28.5$ μm is employed as the periodically poled structure, and further, a continuous phase modulation for a period $\Lambda_{ph} = 12.11$ mm is added to the structure. In this case, 425 periods for the periodically poled structure are included in one period of the phase modulation that was added to the structure. For the evaluation function T represented by expression (5), $\eta_{norm}/3$ is set as a targeted efficiency for the −3rd order, the 0th order and the +1st order peaks, and a value of 0 is set as a targeted efficiency for the other peaks. When the calculation is performed, as needed, to provide the smallest value for the evaluation function T, and the phase modulation is optimized, the highest conversion efficiency can be obtained at the −3rd order, the 0th order and the +1st order peaks.

Figure 6A:
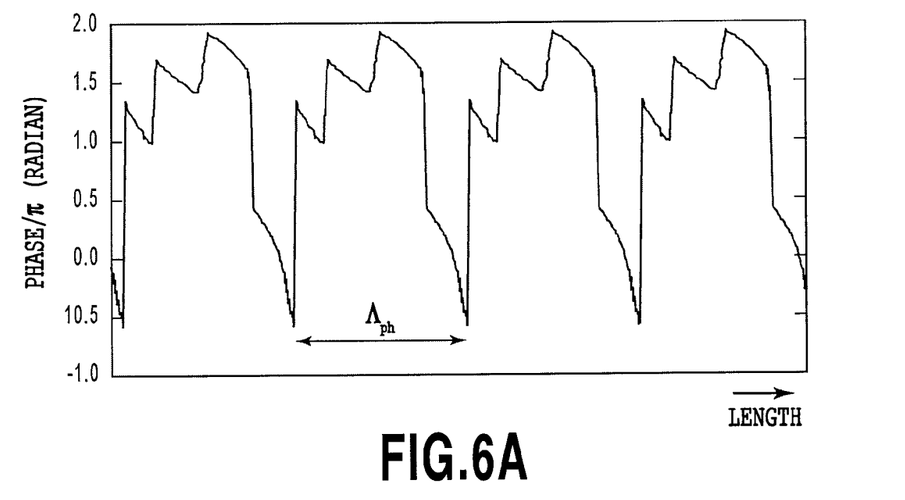
FIG. 6A is a diagram showing a phase modulation curve for a wavelength converter according to embodiment 1.
Figure 6B:
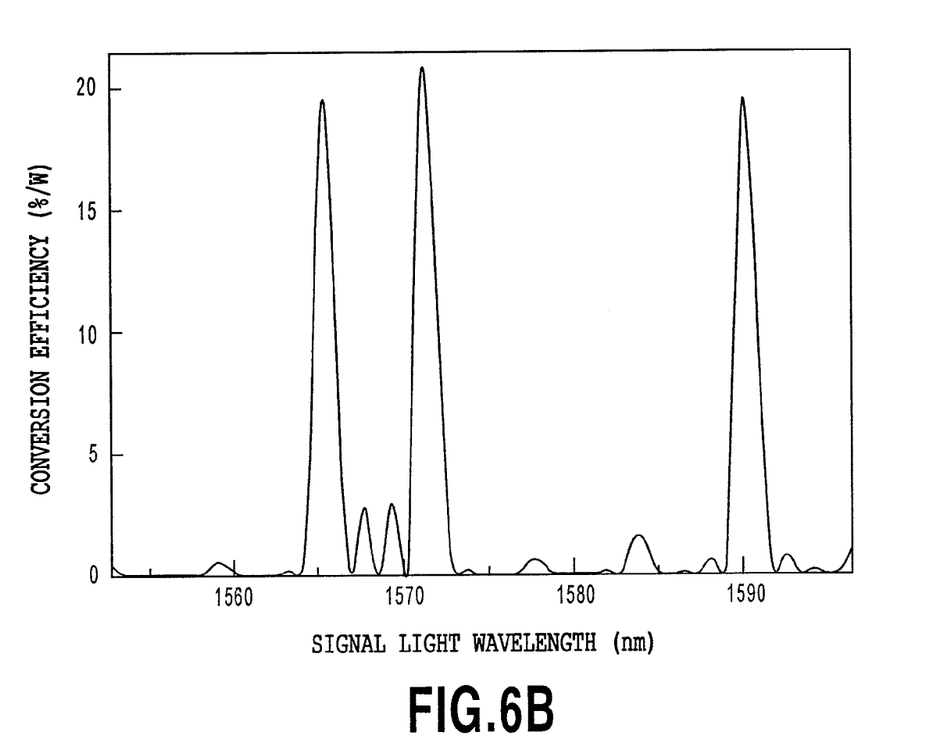
FIG. 6B is a diagram showing a wavelength dependency of conversion efficiency according to embodiment 1 during difference frequency generation.

FIG. 6A illustrates a phase modulation curve for a wavelength converter according to embodiment 1. Signal light is emitted by a tunable light source in the 1.55 μm wavelength band, while the pump light wavelength is fixed at 1.07 μm. FIG. 6B illustrates a wavelength dependency of conversion efficiency, obtained by difference frequency generation for sweeping the signal light wavelength. The horizontal axis represents a signal light wavelength. In embodiment 1, three peaks can be obtained for each wavelengths 1565.5, 1572.0 and 1590.5 nm at unequally intervals. The peak obtained for the wavelength 1572.0 nm corresponds to the 0th order peak obtained in a case of that phase modulation is not performed; the peak obtained at the wavelength of 1565.5 nm corresponds to the +1st order peak obtained by performing phase modulation; and the peak obtained at the wavelength 1590.5 nm corresponds to the −3rd order peak obtained by performing phase modulation.

In embodiment 1, wavelengths of 3380.6 nm (2958 cm$^{-1}$), 3350.7 nm (2984.5 cm$^{-1}$) and 3269.6 nm (3058.5 cm$^{-1}$) can be produced by difference frequency generation. These wavelengths are effective for detecting a plurality of gases that are absorbed at these wavelengths. The wavelength band of the signal light at the individual peaks is about 2 nm. This indicates that when fine adjustment of a signal wavelength is performed for an individual peak, wavelength sweeping of about 8.3 cm$^{-1}$ can be performed for the conversion light.

The conversion efficiency at the three peaks for the wavelength converter employed in embodiment 1 is about 20%/W. When a signal light of 10 mW and a pump light of 40 mW are entered for the converter, an output of 80 μW is obtained. In a case of that the wavelength converter is applied for the light source of a gas measurement apparatus, a satisfactory output for gas detection can be obtained without an optical amplifier being required.

Embodiment 2

In embodiment 1, phase modulation was added to the periodically poled structure, and difference frequency generation was enabled using a plurality of signal light wavelengths that are unequally intervals. According to embodiment 2, frequency modulation is added to a periodically poled structure. The process is performed as in embodiment 1, i.e., a signal light wavelength in the 1.55 μm band and a pump light wavelength of 1.07 μm are employed, and conversion light in a 3.4 μm wavelength band is obtained by difference frequency generation. Further, a method used for the manufacture of a wavelength converter is the same as that used for embodiment 1.

In embodiment 2, a modulation structure having a basic period $\Lambda_0$=28.5 μm is employed as the periodically poled structure, and further, a continuous frequency modulation for a period $\Lambda_f$=12.11 mm is added to the structure. In this case, 425 periods for the periodically poled structure are included in one period of the frequency modulation that was added to the structure. For the evaluation function T represented by expression (5), $\eta_{norm}/3$ is set as a target efficiency for the −3rd order, the 0th order and the +1st order peaks, and a value of 0 is set as a target efficiency for the other peaks. When a calculation is performed, as needed, to provide the smallest value for the evaluation function T, and the frequency modulation is optimized, the highest conversion efficiency can be obtained at the −3rd order, the 0th order and the +1st order peaks.

Figure 7A:
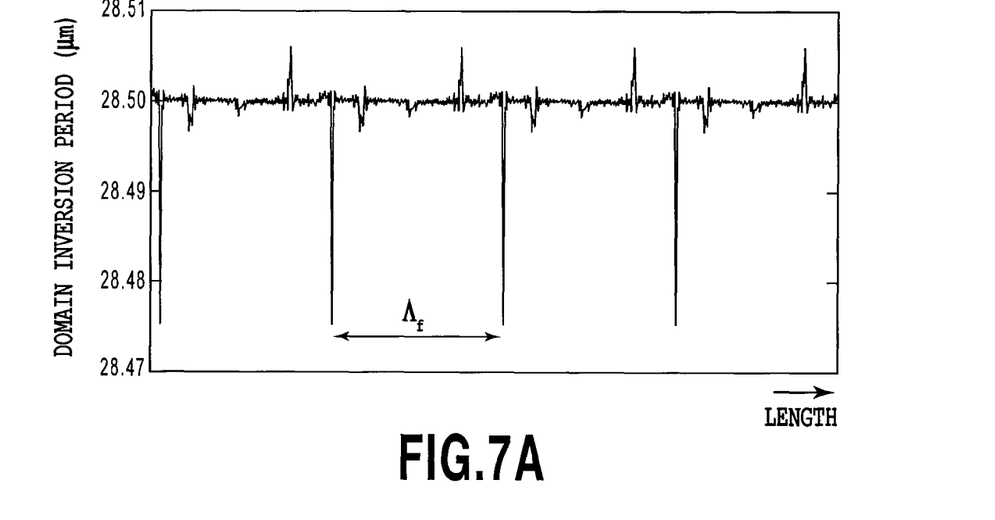
FIG. 7A is a diagram showing a frequency modulation curve for a wavelength converter according to embodiment 2.
Figure 7B:
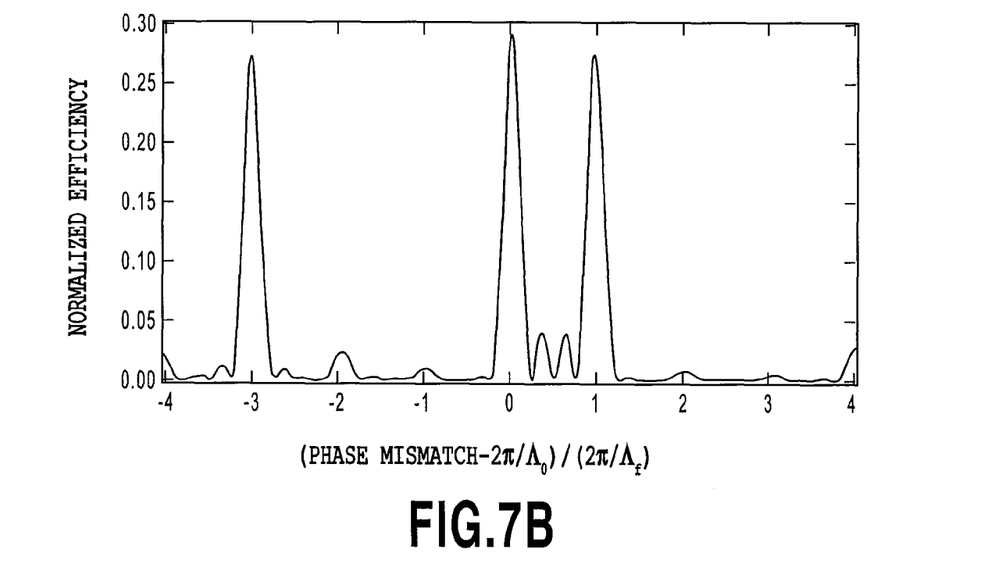
FIG. 7B is a diagram showing a wavelength dependency of conversion efficiency according to embodiment 2 during difference frequency generation.

FIG. 7A illustrates a frequency modulation curve for a wavelength converter according to embodiment 2. Signal light is emitted by a tunable light source in the 1.55 μm wavelength band, while the pump light wavelength is fixed at 1.07 μm. FIG. 7B illustrates a wavelength dependency of conversion efficiency according to the embodiment 2 during difference frequency generation. In embodiment 2, three peaks can be obtained for each wavelengths 1565.5, 1572.0 and 1590.5 nm at unequally intervals. The conversion efficiency shown here is normalized by employing a value of 1 in a case of the efficiency of the wavelength converter that has a modulation structure having a length L=48 mm and a basic period $\Lambda_0$=28.5 μm. Therefore, in a case of that the wavelength converter of embodiment 2 is compared with a wavelength converter for which frequency modulation is not being provided, the conversion efficiency is about 30%.

In embodiment 2, the same output as that provided in embodiment 1 can be obtained by employing frequency modulation, and is useful for detection of a plurality of gases. The conversion efficiency at the three peaks of the wavelength converter in embodiment 2 is about 20%/W. When a signal light of 10 mW and a pump light of 40 mW are entered for the converter, an output of 80 μW is obtained. When this converter is applied for the light source of a gas measurement apparatus, a satisfactory output for gas detection can be obtained without an optical amplifier being required.

Embodiment 3

In embodiments 1 and 2, phase modulation or frequency modulation was added to the periodically poled structure, and the −3rd order, the 0th order and +1st order phase matching peaks were obtained. According to embodiment 3, phase modulation is added to a periodically poled structure to obtain peaks of different orders. Also in embodiment 3, a signal light wavelength in the 1.55 μm band and a pump light wavelength of 1.07 μm are employed, and conversion light in the 3.4 μm wavelength band is obtained. Further, a method used for the manufacture of a wavelength converter is the same as that used for embodiment 1.

In embodiment 3, a modulation structure having a basic period $\Lambda_0$=28.5 μm is employed as the periodically poled structure, and further, a continuous phase modulation for a period $\Lambda_{ph}$=12.11 mm is added to the structure. In this case, 425 periods for the periodically poled structure are included in one period for the phase modulation. For the evaluation function T represented by expression (5), $\eta_{norm}/3$ is set as a target efficiency for the −2nd order, the 0th order and the +3rd order peaks, and a value of 0 is set as a target efficiency for at the other peaks. When a calculation is performed, as needed, to provide the smallest value for the evaluation function T, and the phase modulation is optimized, the highest conversion efficiency can be obtained at the −2nd order, the 0th order and the +3rd order peaks.

Figure 8A:
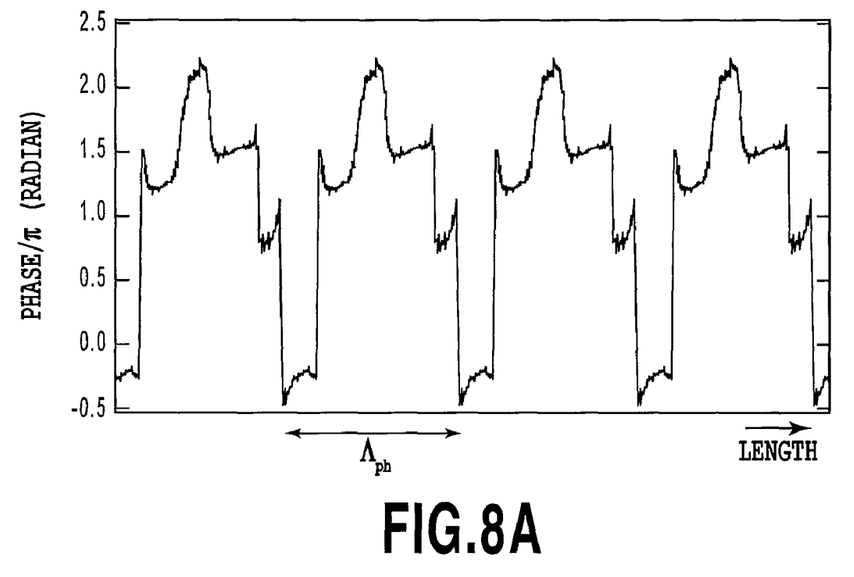
FIG. 8A is a diagram showing a phase modulation curve for a wavelength converter according to embodiment 3.
Figure 8B:
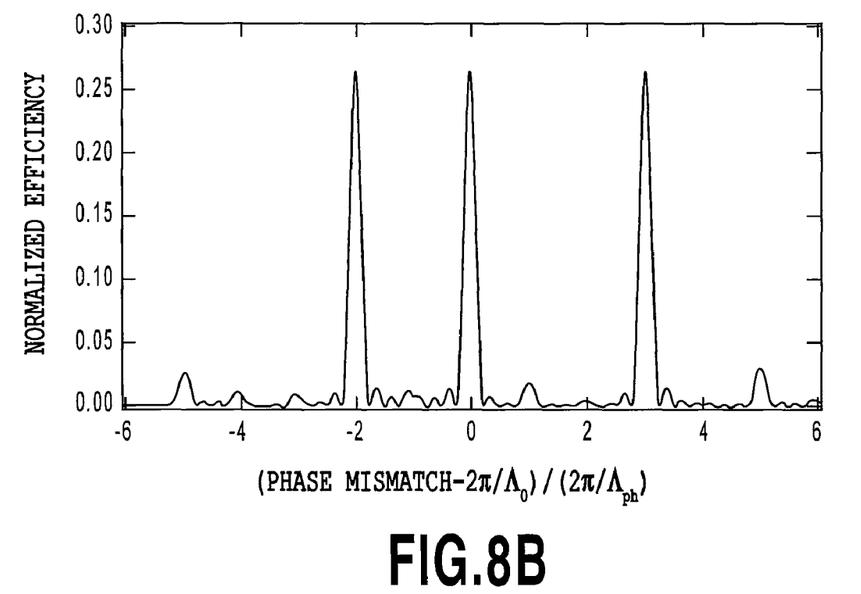
FIG. 8B is a diagram showing a wavelength dependency for conversion efficiency according to embodiment 3 during difference frequency generation.

FIG. 8A illustrates a phase modulation curve for a wavelength converter according to embodiment 3. Signal light is emitted by a tunable light source in the 1.55 μm wavelength band, while the pump light wavelength is fixed at 1.07 μm. FIG. 8B illustrates a wavelength dependency for conversion efficiency according to embodiment 3 during difference frequency generation. In embodiment 3, three, three peaks can be obtained for each wavelengths 1552.5, 1572.0 and 1584.3 nm at unequally intervals. The conversion efficiency shown here is normalized by employing a value of 1 in a case of the efficiency of the wavelength converter that has a modulation structure having a length L=48 mm and a basic period $\Lambda_0$=28.5 μm. Therefore, in a case of that the wavelength converter of embodiment 2 is compared with a wavelength converter for which a periodical modulation is not being provided, the conversion efficiency is about 27%.

In embodiment 3, the same output as that provided in embodiment 1 can be obtained by employing phase modulation, and is useful for detection of a plurality of gases. The conversion efficiency at the three peaks of the wavelength converter in embodiment 1 is about 18%/W. When a signal light of 10 mW and a pump light of 40 mW are entered for the converter, an output of 72 µW is obtained. When this converter is applied for the light source of a gas measurement apparatus, a satisfactory output for gas detection can be obtained without an optical amplifier being required. As described above, since the phase modulation or frequency modulation function is optimized to obtain a desired peak, the phase matching peaks can be unequally allocated for various wavelengths.

Embodiment 4

Figure 9:
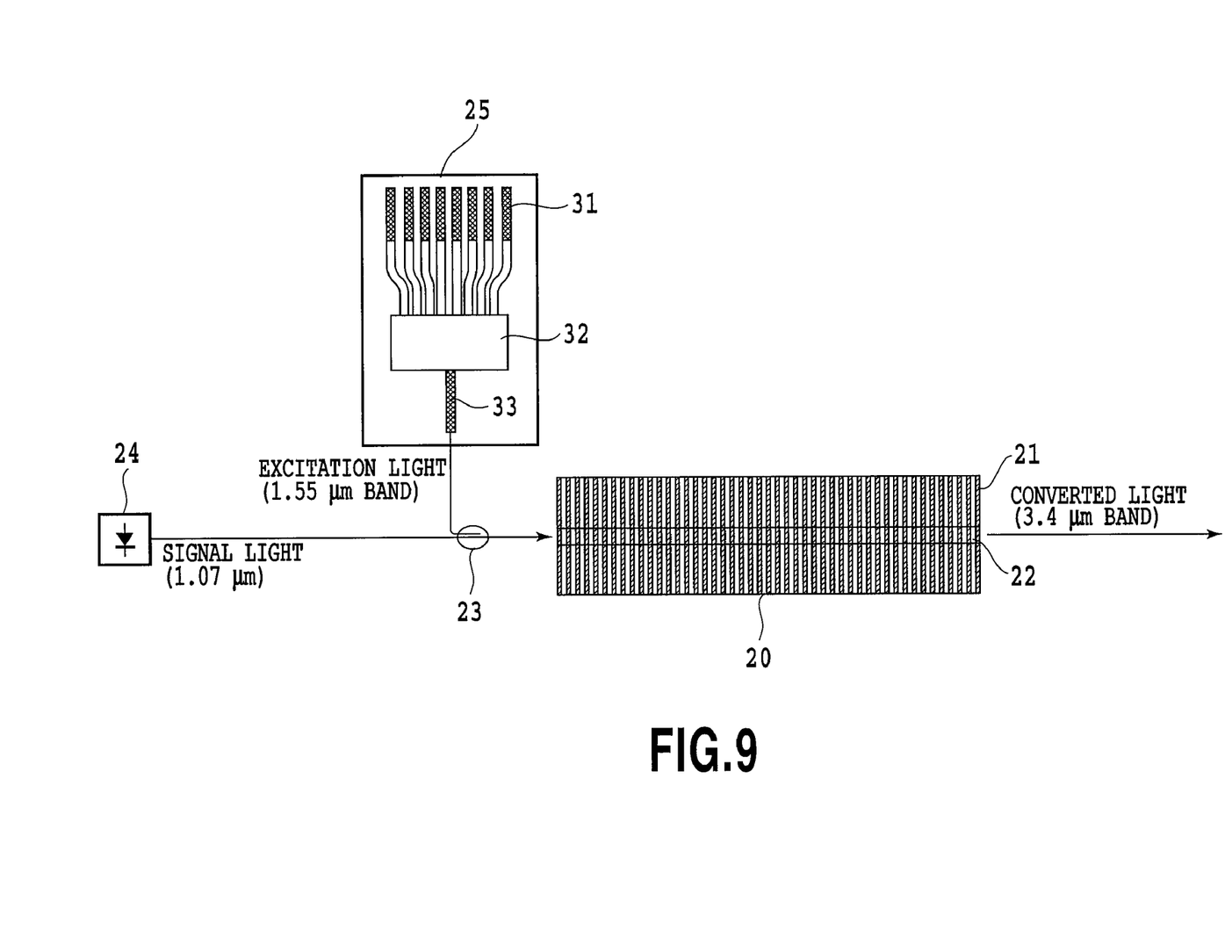
FIG. 9 is a diagram illustrating an arrangement of a wavelength conversion apparatus according to embodiment 4.

FIG. 9 illustrates an arrangement of a wavelength conversion apparatus according to an embodiment 4. A wavelength converter 20 includes an optical waveguide 22 that is formed in a $LiNbO_3$ substrate and has periodically poled structure. A multiplexer 23 multiplexes pump light emitted by a pump light source 24 with signal light emitted by a signal light source 25, and enters the multiplexed light to the optical waveguide 22. The pump light source 24 outputs a pump light of 1.07 µm, and the signal light source 25 outputs a signal light within a 1.55 µm band. Through difference frequency generation employing nonlinear optical effects, the wavelength conversion apparatus can output a plurality of conversion light wavelengths in a 3.4 µm band.

The signal light source 25 is a tunable light source in a 1.55 µm band, and a TLA (Tunable Laser Array) is employed (see, for example, non-patent document 4). The signal light source 25 includes a plurality of DFB-LDs (Distributed Feedback-Laser Diodes) 31, a coupler 32, for coupling light emitted by the individual DFB-LDs 31 and a semiconductor optical amplifier (SOA) 33 connected to the output terminal of the coupler 32. The signal light source 25 is a semiconductor optical integrated circuit, which selects a DFB-LD 31 to quickly change a wavelength to be output.

The method used for the manufacture of a wavelength converter 20 is the same as that used for embodiment 1. In embodiment 4, a modulation structure having a basic period $\Lambda_0=28.5$ µm is employed as the periodically poled structure, and further, a continuous phase modulation for a period $\Lambda_{ph}=12.11$ mm is added to the structure. Thus, 425 periods for the periodically poled structure are included in one period of the phase modulation that was added to the structure. For the evaluation function T represented by expression (5), target efficiencies at the −3rd order; the 0th order and +1st order peaks are set as $\eta_{norm}/4$, $\eta_{norm}/4$ and $\eta_{norm}/2$, while target efficiencies at the other peaks are set as 0. When calculation is performed, as needed, to provide the smallest value for the evaluation function T, and the phase modulation is optimized. And as a result, the conversion efficiency at the +1st order peak is higher than that at the −3rd order and the 0th order peaks.

Figure 10A:
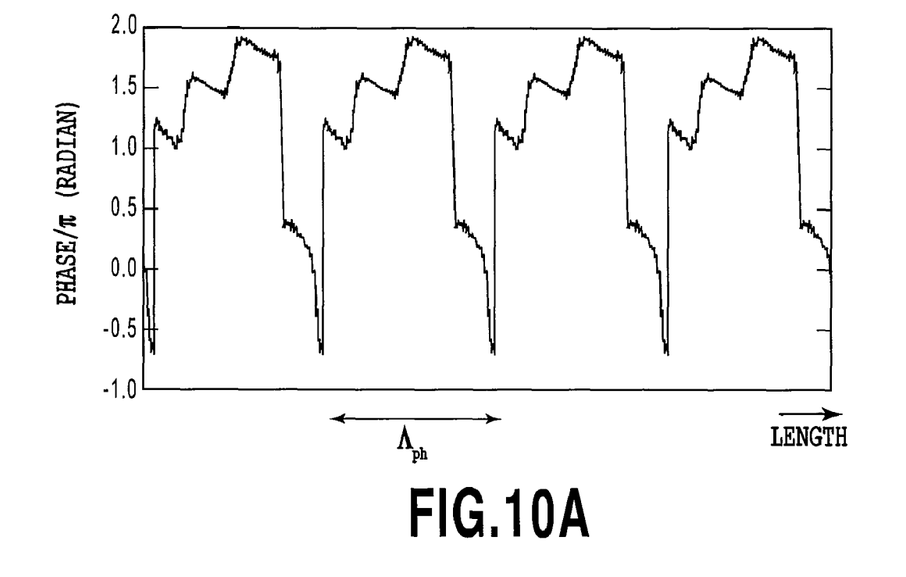
FIG. 10A is a diagram showing a phase modulation curve for a wavelength converter according to embodiment 4.
Figure 10B:
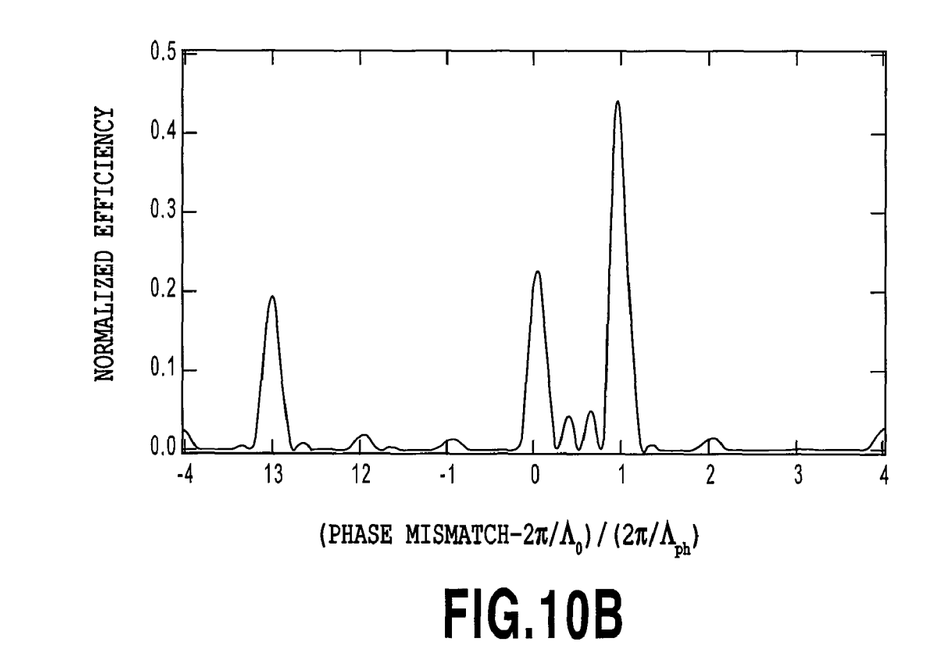
FIG. 10B is a diagram showing a wavelength dependency for conversion efficiency according to embodiment 4, during difference frequency generation.

FIG. 10A illustrates a phase modulation curve for a wavelength converter according to embodiment 4. Signal light is emitted by a tunable light source in the 1.55 µm wavelength band, while the pump light wavelength is fixed at 1.07 µm. FIG. 10B illustrates a wavelength dependency for conversion efficiency according to embodiment 4 during difference frequency generation. And in embodiment 4, three peaks can be obtained for each wavelengths 1565.5, 1572.0 and 1590.5 nm at unequally intervals. The ratio of the conversion efficiencies at the −3rd order, 0th order and +1st order peaks is 25%, 25% and 50% respectively when the total of the conversion efficiencies is 100%. The conversion efficiency shown is normalized by employing a value of 1 in a case of the efficiency of the wavelength converter that has a modulation structure having a length L=48 mm and a basic period $\Lambda_0=28.5$ µm.

The conversion efficiencies at the −3rd order, the 0th order and the +1st order peaks are 13%/W, 14%/W and 28%/W respectively. When a signal light of 10 mW, emitted by the TLA, and a pump light of 40 mW are entered for the converter, outputs of 56 µW, 56 µW and 112 µW are obtained, respectively, for conversion light wavelengths of 3269.6 nm (3058.5 $cm^{-1}$), 3350.7 nm (2984.5 $cm^{-1}$) and 3380.6 nm (2958 $cm^{-1}$).

Furthermore, in embodiment 4, when the wavelength of the signal light is quickly changed, a plurality of gases that demonstrate a characteristic absorption for the individual wavelengths can be detected, almost collectively, in a time series manner. Specifically, absorption lines inherent to carbon hydrogen gases, such as methane, ethane and ethylene gases, can be measured at the same time. Further, since the output of the light source at 3380.6 nm is emphasized, deterioration of a S/N ratio can be reduced, even in a case of that the absorption at this wavelength is smaller than at another wavelength.

As described above, according to the embodiments, a plurality of input light wavelengths that are unequally intervals can be simultaneously converted. In addition, the conversion efficiency can be increased by emphasizing a specific peak.

According to the embodiments, since a practically satisfactory output can be obtained without requiring the use of an optical amplifier as a light source, and since a comparatively inexpensive tunable light source for a communication wavelength band can be employed, a less expensive wavelength conversion apparatus that demonstrates high performances can be provided. Furthermore, a tunable laser as employed in the embodiment 4 is comparatively inexpensive for use in an optical communication band, such as 1.55 µm, and can quickly change a wavelength. For the other wavelength bands, a light source as described in non-patent document 5, which has an external grating coupled with a semiconductor laser, is available on the market. However, since this type of light source changes a wavelength by mechanically rotating a grating, the wavelength tuning speed is limited, and the cost of the apparatus is high.

INDUSTRIAL APPLICABILITY

In the embodiments of the invention, regardless of dispersion of a nonlinear optical material, a plurality of wavelengths can be converted by employing an arbitrary set of pump light wavelengths or signal light wavelengths. As described above, a comparatively inexpensive tunable laser that provides high performance can be employed, and a wavelength conversion apparatus or a light source, applied for a gas measurement apparatus, can be constituted at a low cost.

Moreover, when a light source is employed where a plurality of semiconductor lasers are integrated, a gas measurement apparatus can quickly change a plurality of light wavelengths in consonance with absorption lines for a plurality of gases, so that these gases can all be measured at the same time. Further, a phase matching peak for generating a specific wavelength can be greater than other peaks. Then, the output for a wavelength that is to be used for the measurement of a gas which is less readily absorbed than other gases can be emphasized, and the SN ratio can be increased.

The invention claimed is:

1. A wavelength converter for entering incident light of one ($\lambda_1=\lambda_2$) or two ($\lambda_1$ and $\lambda_2$, or $\lambda_1$ and $\lambda_3$) wavelengths having a relationship of $1/\lambda_3=1/\lambda_2+1/\lambda_1$ into a nonlinear optical material to output a converted light of a wavelength $\lambda_3$ or $\lambda_2$, wherein the nonlinear material has a periodic structure, the sign of a nonlinear optical constant being alternately inverted in a propagating direction of light with a period $\Lambda_0$, and wherein an initial phase for each period $\Lambda_0$ is varied so that a variation of the initial phase is changed for a different period $\Lambda_{ph}$, wherein:

refractive indexes for the nonlinear material relative to the wavelengths $\lambda_1$, $\lambda_2$ and $\lambda_3$ are defined as $n_1$, $n_2$ and $n_3$ respectively, the nonlinear material has a periodic structure obtained by changing a variation curve for the initial phase, wherein a phase mismatch $\Delta\beta$ is represented by $\Delta\beta=2\pi(n_3/\lambda_3-n_2/\lambda_2-n_1/\lambda_1)$, and at least three phase matching peaks at unequal intervals within a plurality of phase matching peaks represented by $2\pi/\Lambda_0+2\pi i/\Lambda_{ph}$ (i=m, m+1, . . . , n: where m and n are positive or negative integers) have a highest conversion efficiency so that the smallest value for an evaluation function T is obtained, wherein a spatial change d(z) for the nonlinear optical constant at a location z in the light propagating direction is calculated; a Fourier transform is performed for the spatial change d(z); conversion efficiencies η(i) at individual phase matching peaks are obtained; and a desired conversion efficiency $\eta_t(i)$ is employed to calculate the evaluation function T, as below, $$T=\Sigma_{i=m}^{i=n}[\eta(i)-\eta_t(i)]^2.$$

2. The wavelength converter according to claim 1, wherein the nonlinear optical material is either $LiNbO_3$, $KNbO_3$, $LiTaO_3$, $LiNb_{(x)}Ta_{(1-x)}O_3$ ($0\leq x\leq 1$), $Li_{(x)}K_{(1-x)}Ta_{(y)}Nb_{(1-y)}O_3$ or $KTiOPO_4$, or one of those compounds that contains at least one component selected from a group consisting of Mg, Zn, Sc and In as an additive.

3. A wavelength conversion apparatus comprising:
a signal light source being wavelength tunable type for outputting a signal light of a wavelength $\lambda_1$;
a pump light source for outputting a pump light of a wavelength $\lambda_2$ or $\lambda_3$;
a multiplexer for multiplexing the signal light and the pump light; and
a wavelength converter according to claim 1, said wavelength converter being connected to the multiplexer and entering incident light of two wavelengths ($\lambda_1$ and $\lambda_2$, or $\lambda_1$ and $\lambda_3$) having a relationship of $1/\lambda_3=1/\lambda_2+1/\lambda_1$ into a nonlinear optical material to output a converted light of the wavelength $\lambda_3$ or $\lambda_2$.

4. The wavelength conversion apparatus according to claim 3, wherein the signal light source comprises:
a plurality of DFB-LDs;
a coupler for coupling lights outputted by the individual DFB-LDs; and
a semiconductor optical amplifier connected to an output terminal of the coupler.

5. A wavelength conversion apparatus comprising:
a signal light source being wavelength tunable type for outputting a signal light of a wavelength $\lambda_1$;
a wavelength converter according to claim 1, said wavelength converter being connected to the signal light source and entering incident light of one wavelength ($\lambda_1=\lambda_2$) having a relationship of $1/\lambda_3=1/\lambda_2+1/\lambda_1$ into a nonlinear optical material to output a converted light of the wavelength $\lambda_3$.

6. The wavelength conversion apparatus according to claim 5, wherein the signal light source comprises:
a plurality of DFB-LDs;
a coupler for coupling lights outputted by the individual DFB-LDs; and
a semiconductor optical amplifier connected to an output terminal of the coupler.

7. A wavelength converter for entering incident light of one ($\lambda_1=\lambda_2$) or two ($\lambda_1$ and $\lambda_2$, or $\lambda_1$ and $\lambda_3$) wavelengths having a relationship of $1/\lambda_3=1/\lambda_2+1/\lambda_1$ into a nonlinear optical material to output a converted light of a wavelength $\lambda_3$ or $\lambda_2$, wherein the nonlinear material has a periodic structure, the sign of a nonlinear optical constant being alternately inverted in a propagating direction of light with a basic period $\Lambda_0$, and wherein each period is varied from the basic period $\Lambda_0$ so that a variation of each period is continuously changed for a different period $\Lambda_f$, wherein:

refractive indexes for the nonlinear material relative to the wavelengths $\lambda_1$, $\lambda_2$ and $\lambda_3$ are defined as $n_1$, $n_2$ and $n_3$ respectively, the nonlinear material has a periodic structure obtained by changing a variation curve for each period, wherein a phase mismatch $\Delta\beta$ is represented by $\Delta\beta=2\pi(n_3/\lambda_3-n_2/\lambda_2-n_1/\lambda_1)$, and at least three phase matching peaks at unequal intervals within a plurality of phase matching peaks represented by $2\pi/\Lambda_0+2\pi i/\Lambda_f$ (i=m, m+1, . . . , n: where m and n are positive or negative integers) have a highest conversion efficiency so that the smallest value for an evaluation function T is obtained, wherein a spatial change d(z) for the nonlinear optical constant at a location z in the light propagating direction is calculated; a Fourier transform is performed for the spatial change d(z); conversion efficiencies η(i) at individual phase matching peaks are obtained; and a desired conversion efficiency $\eta_t(i)$ is employed to calculate the evaluation function T, as below, $$T=\Sigma_{i=m}^{i=n}[\eta(i)-\eta_t(i)]^2.$$

8. The wavelength converter according to claim 7, wherein the nonlinear optical material is either $LiNbO_3$, $KNbO_3$, $LiTaO_3$, $LiNb_{(x)}Ta_{(1-x)}O_3$ ($0\leq x\leq 1$), $Li_{(x)}K_{(1-x)}Ta_{(y)}Nb_{(1-y)}O_3$ or $KTiOPO_4$, or one of those compounds that contains at least one component selected from a group consisting of Mg, Zn, Sc and In as an additive.

9. A wavelength conversion apparatus comprising:
a signal light source being wavelength tunable type for outputting a signal light of a wavelength $\lambda_1$;
a pump light source for outputting a pump light of a wavelength $\lambda_2$ or $\lambda_3$;
a multiplexer for multiplexing the signal light and the pump light; and
a wavelength converter according to claim 7, said wavelength converter being connected to the multiplexer and entering incident light of two wavelengths ($\lambda_1$ and $\lambda_2$, or $\lambda_1$ and $\lambda_3$) having a relationship of $1/\lambda_3=1/\lambda_2+1/\lambda_1$ into a nonlinear optical material to output a converted light of the wavelength $\lambda_3$ or $\lambda_2$.

10. The wavelength conversion apparatus according to claim 9, wherein the signal light source comprises:
a plurality of DFB-LDs;
a coupler for coupling lights outputted by the individual DFB-LDs; and
a semiconductor optical amplifier connected to an output terminal of the coupler.

11. A wavelength conversion apparatus comprising:
a signal light source being wavelength tunable type for outputting a signal light of a wavelength $\lambda_1$;

a wavelength converter according to claim 7, said wavelength converter being connected to the signal light source and entering incident light of one wavelength ($\lambda_1 = \lambda_2$) having a relationship of $1/\lambda_3 = 1/\lambda_2 + 1/\lambda_1$ into a nonlinear optical material to output a converted light of the wavelength $\lambda_3$.

12. The wavelength conversion apparatus according to claim 11, wherein the signal light source comprises:

a plurality of DFB-LDs;
a coupler for coupling lights outputted by the individual DFB-LDs; and
a semiconductor optical amplifier connected to an output terminal of the coupler.

* * * * *